US012724814B2

(12) United States Patent
Cafarella et al.

(10) Patent No.: US 12,724,814 B2
(45) Date of Patent: Sep. 1, 2026

(54) SELECTIVE CONTENT GENERATION

(71) Applicant: SpaceCraft, Inc., Beverly Hills, CA (US)

(72) Inventors: Michael John Cafarella, Newton Highlands, CA (US); Ian M. Richter, Los Angeles, CA (US); Alexis R. Haraux, Seattle, WA (US)

(73) Assignee: SpaceCraft, Inc., Beverly Hills, CA (US)

( * ) Notice: Subject to any disclaimer, the term of this patent is extended or adjusted under 35 U.S.C. 154(b) by 0 days.

(21) Appl. No.: 18/538,676

(22) Filed: Dec. 13, 2023

(65) Prior Publication Data

US 2024/0193201 A1 Jun. 13, 2024

Related U.S. Application Data

(60) Provisional application No. 63/432,258, filed on Dec. 13, 2022.

(51) Int. Cl.
*G06N 20/00* (2019.01)
*G06F 16/334* (2025.01)
*G06F 16/353* (2025.01)

(52) U.S. Cl.
CPC ........ *G06F 16/353* (2019.01); *G06F 16/3344* (2019.01)

(58) Field of Classification Search
CPC .......... G06N 5/027; G06N 20/00; G06N 3/08; G06N 3/09; G06N 3/045; G06N 20/20; G06N 3/084; G06N 7/01; G06N 5/022; G06N 3/082; G06N 5/01; G06F 16/2423; G06F 16/254; G06F 16/284; G06F 40/126; G06F 40/186; G06F 40/30; G06F 16/35; G06F 16/93; G06F 17/18; G06F 40/216; G06F 40/284; G06F 40/58; G06F 11/302; G06F 16/335; G06F 18/213; G06F 18/22; G06F 18/23; G06F 18/24; G06F 21/56; G06F 40/166; G06F 16/164; G06F 40/131; G06Q 10/06316; G06Q 30/02; G06Q 50/01; G06V 10/774; G06V 10/82; G06T 9/00; G06T 7/11; G06T 7/70; G06T 11/00; G06T 19/006; G06T 7/0014; G06T 7/0016
See application file for complete search history.

(56) References Cited

U.S. PATENT DOCUMENTS

2006/0218651 A1* 9/2006 Ginter .................... G06F 21/33 375/E7.009
2013/0073387 A1* 3/2013 Heath .................... G06Q 30/02 705/14.53

(Continued)

*Primary Examiner* — Shyue Jiunn Hwa
(74) *Attorney, Agent, or Firm* — Fernando & Partners, LLP

(57) ABSTRACT

In one implementation, a method of generating content is performed at a device having one or more processors and non-transitory memory. The method includes obtaining a database including a plurality of elements. The method includes generating a prompt to select one of the plurality of elements that satisfies one or more criteria regarding a topic of interest. The method includes submitting the prompt to a foundational model trained on a training dataset. The method includes receiving, from the foundational model in response to the prompt, content including a selected one of the plurality of elements.

20 Claims, 2 Drawing Sheets

(56) References Cited

U.S. PATENT DOCUMENTS

| | | | | |
|---|---|---|---|---|
| 2015/0067512 | A1* | 3/2015 | Roswell | H04L 12/1813 715/716 |
| 2015/0161719 | A1* | 6/2015 | Abhyanker | G06Q 30/0645 705/307 |
| 2017/0242913 | A1 | 8/2017 | Tijssen et al. | |
| 2019/0122073 | A1* | 4/2019 | Ozdemir | G06V 20/56 |
| 2020/0012721 | A1 | 1/2020 | Pasupalak et al. | |
| 2021/0118442 | A1 | 4/2021 | Poddar et al. | |
| 2021/0133234 | A1 | 5/2021 | Bedadala et al. | |
| 2023/0196035 | A1* | 6/2023 | Thoniparambil | G06F 40/58 704/3 |

* cited by examiner

SELECTIVE CONTENT GENERATION

CROSS-REFERENCE TO RELATED APPLICATIONS

This application claims priority to U.S. Provisional Patent App. No. 63/432,258, filed on Dec. 13, 2022, which is hereby incorporated by reference in its entirety.

TECHNICAL FIELD

The present disclosure generally relates to generating content.

BACKGROUND

A foundational model is a deep learning algorithm that has been trained with an extremely large dataset that can be adapted to a variety of downstream tasks. For example, a text-generating foundation model generates text based on a provided text prompt. Such a foundational model can be used, based on the prompt, to generate conversation, product descriptions, computer code, or any other text. As another example, an audio-generating foundational model generates audio based on a provided text prompt. As another example, an image-generating foundational model generate images based on a provided text prompt. Many foundational models are trained on data scraped from the internet. Accordingly, the foundational model may be trained (and produce as a result) content that is objectionable for a particular purpose. For example, the content may be copyrighted, obscene, prejudicial (e.g., racist, sexist, or homophobic), or overly complex. Thus, it may be beneficial to generate content using a foundational model while ensuring that the resulting content is not objectionable.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
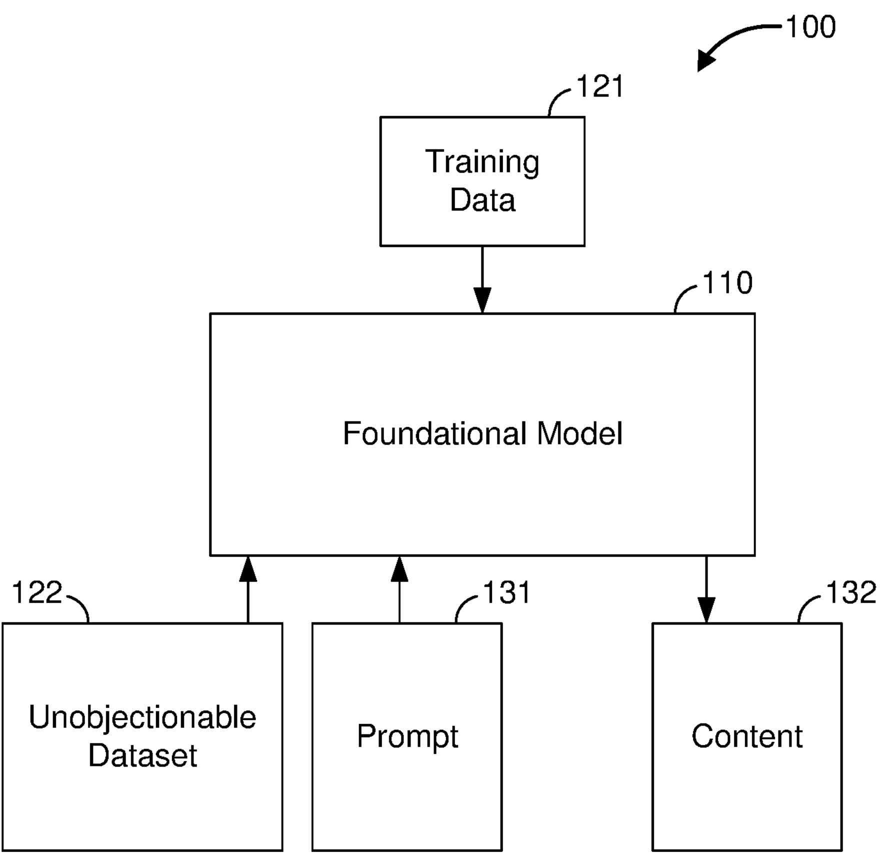
FIG. 1 illustrates a block diagram of a content generation system according to various implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for generating content. In various implementations, the method is performed at a device having one or more processors and non-transitory memory. The method includes obtaining a database including a plurality of elements. The method includes generating a prompt to select one of the plurality of elements that satisfies one or more criteria regarding a topic of interest.

The method includes submitting the prompt to a foundational model trained on a training dataset. The method includes receiving, from the foundational model in response to the prompt, content including a selected one of the plurality of elements.

In accordance with some implementations, a device includes one or more processors, a non-transitory memory, and one or more programs; the one or more programs are stored in the non-transitory memory and configured to be executed by the one or more processors. The one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

As noted above, in various implementations, a foundational model (or generative model) is trained on an extremely large dataset including objectionable content. To ensure that the content generated in response to a prompt does not include objectionable content, the prompt provided to the foundational model requests selection of an element from a database of unobjectionable elements. Further, conditional prompts are provided to request selection of additional elements from the database of unobjectionable elements conditioned on the previous selections. For example, to generate a paragraph regarding a topic, an initial prompt is provided to the foundational model which requests that the foundational model select which of the elements in the database is an opening sentence of a paragraph regarding the topic. One or more following prompts are provided to the foundational model which requests that the foundational model select which of the elements in the database is a body sentence of a paragraph regarding the topic given the opening sentence (and other body sentences) previously returned. A final prompt is provided to the foundation model which requests that the foundational model select which of the elements in the database is a concluding sentence of a paragraph regarding the topic given the opening sentence and the following sentences.

FIG. 1 illustrates a block diagram of a content generation system 100 according to various implementations. The content generation system 100 includes a foundational model 110 trained on training data 121. The training data 121 is an extremely large dataset that includes both objectionable and unobjectionable content. For example, in various implementations, the training data 121 includes data from the internet (such as Common Crawl, WebText2, or Wikipedia).

The content generation system 100 further includes an unobjectionable dataset 122 that includes a plurality of unobjectionable elements. In various implementations, the elements are text, such as letters, phonemes, words, or sentences. In various implementations, the elements are images. In various implementations, the unobjectionable dataset 122 is a subset of the training data 121, including only unobjectionable elements, whereas the training data includes both objectionable and unobjectionable content.

The foundational model 110 receives a prompt 131 and generates content 132 in response to the prompt 131. In various implementations, the prompt 131 requests selection of one of the plurality of elements of the unobjectionable dataset 122 that satisfies one or more criteria regarding a topic of interest. For example, in various implementations, the prompt 131 requests selection of one of the plurality of elements of the unobjectionable dataset 122 that is an opening sentence of a paragraph regarding the topic of interest. In various implementations, the prompt 131 requests selection of one of the plurality of elements of the unobjectionable dataset 122 that is a body sentence of a paragraph regarding the topic of interest given that the paragraph begins with a particular sentence or sentences (which may themselves be generated in response to one or more prompts). Thus, in various implementations, the content 132 generated in response to the prompt includes a selected one of the plurality of elements of the unobjectionable dataset 122.

As an example, the unobjectionable dataset may include, as the plurality of elements, a plurality of sentences from works in the public domain. An initial prompt may be "Which of the elements in the unobjectionable dataset is an opening sentence for a paragraph about elephants?" and the response may be "Elephants are large land-dwelling mammals." A following prompt may be "Which of the elements in the unobjectionable dataset is a sentence in a paragraph about elephants that follows 'Elephants are large land-dwelling mammals.'?" and the response may be "Elephants are recognized by such features as a trunk, tusks, and large ears." A final prompt may be "Which of the elements in the unobjectionable dataset is a concluding sentence of a paragraph about elephants that follows 'Elephants are large land-dwelling mammals. Elephants are recognized by such features as a truck, tusks, and large ears.'?" and the response may be "Elephants are endangered despite their diverse appearance in art, religion, and popular culture." Thus, the following paragraph is generated by concatenating the responses: "Elephants are large land-dwelling mammals. Elephants are recognized by such features as a truck, tusks, and large ears. Elephants are endangered despite their diverse appearance in art, religion, and popular culture." As each element is in the public domain, the resulting paragraph is presumably free of copyright.

As another example, the unobjectionable dataset may include, as the plurality of elements, a plurality of words. For example, to generate simply understood content, the plurality of words may include words a sixth grader would know or the word list of Odgen's Basic (British American Scientific International and Commercial) English. As another example, the unobjectionable dataset may include, as the plurality of elements, a plurality of letters. For example, to generate stilted or sesquipedalian dialogue for a virtual character, the plurality of letters may include all the letters of the alphabet except for the letter 'a'. Thus, dialogue for a virtual character may include "People refer to me using the term: Tim" rather than "My name is Tim." As another example, to generate unusual dialogue for a virtual character, the plurality of letters may include the letters of the English alphabet corresponding to the letters of the Hawaiian alphabet ('a', 'e', 'i', 'o', 'u', 'h', 'k', 'l', 'm', 'n', 'p', and 'w').

As another example, the unobjectionable dataset may include, as the plurality of elements, a plurality of pictures. For example, to generate black-and-white photographs, the plurality of pictures may include grayscale images or monochromatic clipart.

In various implementations, the prompt 131 requests selection of multiple elements of the unobjectionable dataset. For example, the prompt 131 may request selection of an opening sentence from the unobjectionable dataset, a body sentence from the unobjectionable dataset that follows the selected opening sentence, and a concluding sentence from the unobjectionable dataset that follows the selected opening sentence and selected body sentence.

In various implementations, the output of the foundational model 110 can sometimes generate incorrect information or content that is nonresponsive to the prompt 131. For example, in response to the prompt "How many letters are in the word 'Tuesday'?" the content 132 may be "There are seven letters in the word 'Tuesday'." (which is true) or may be "6" (which is false). As another example, in response to the prompt "Write a sentence only using vowels and the letters 'b', 'c', and 'd'" the content 132 may be "I did abide." (which is responsive) or "I baked a cabbage." (which non-responsively includes the letters 'k' and 'g'). Thus, in various implementations, the content 132 is verified to confirm that the content 132 is a selected one of the plurality of elements of the unobjectionable dataset 122.

In various implementations, rather than requesting selection, the prompt 131 requests generation of content only including elements from the unobjectionable dataset 122. For example, in various implementations, the prompt 131 may be "Write a paragraph about dolphins using only the elements of the unobjectionable dataset." Each sentence of the paragraph is then checked against the unobjectionable dataset 122 to confirm that each sentence is an element of the unobjectionable dataset 122.

In various implementations, the unobjectionable content includes a plurality of elements respectively associated with a plurality of unique element identifiers. Accordingly, in various implementations, in response to a prompt 131 requesting selection, rather than outputting the content 132 directly, the foundational model 110 outputs the unique element identifier of the selected element. The content 132 is then extracted from the unobjectionable dataset 122 based on the unique element identifier of the selected element and the content 132 is unambiguously an element of the plurality of elements.

In various implementations, the concatenated content of a plurality of conditional responses is streamlined. For example, in the paragraph regarding elephants above, the repeated use of the same noun (e.g., "Elephants") may be replaced by synonyms or pronouns to produce: "Elephants are large land-dwelling mammals. They are recognized by such features as a truck, tusks, and large ears. These animals are endangered despite their diverse appearance in art, religion, and popular culture." In various implementations, the streamlining is performed by a human operator. In various implementations, the streamlining is performed by the foundational model 110. For example, in response to the prompt "Proofread the following: 'Elephants are large land-dwelling mammals. Elephants are recognized by such features as a truck, tusks, and large ears. Elephants are endangered despite their diverse appearance in art, religion, and popular culture.'" the content 132 may be "Elephants are large land-dwelling mammals that are recognized by their trunk, tusks, and large ears. Despite their diverse appearance in art, religion, and popular culture, elephants are endangered."

In various implementations, as noted above, prompt 131 requests selection of one of the plurality of elements of the unobjectionable dataset 122 that satisfies one or more criteria regarding a topic of interest. In various implementations, the prompt 131 requests selection of one of the plurality of elements of the unobjectionable dataset 122 that satisfies other criteria. For example, in various implementations, the prompt 131 may be "Which of the sentences in the unobjectionable dataset sounds archaic?" or "Which of the photographs in the unobjectionable dataset evokes anger?"

Figure 2:
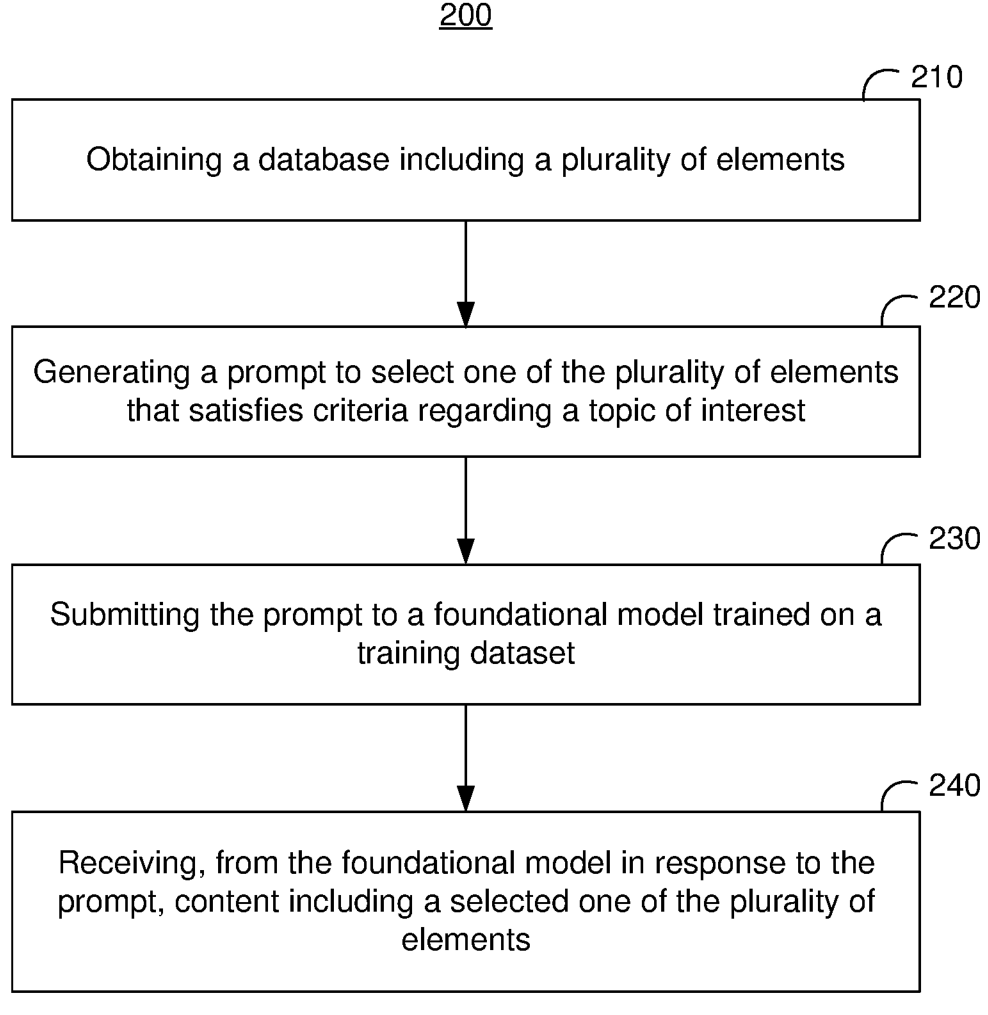
FIG. 2 illustrates a flowchart representation of a method of displaying virtual content in accordance with some implementations.

FIG. 2 is a flowchart representation of a method 200 of generating content in accordance with some implementations. In various implementations, the method 200 is performed by a device including one or more processors and non-transitory memory. In some implementations, the method 200 is performed by processing logic, including hardware, firmware, software, or a combination thereof. In some implementations, the method 200 is performed by a processor executing instructions (e.g., code) stored in a non-transitory computer-readable medium (e.g., a memory).

The method 200 begins, in block 210, with the device obtaining a database including a plurality of elements. In various implementations, the plurality of elements includes a plurality of text elements. For example, in various implementations, each of the plurality of elements includes a single letter or a phoneme. In various implementations, each of the plurality of elements includes a single word. In various implementations, each of the plurality of elements includes a single sentence. In various implementations, the plurality of elements includes a plurality of image elements.

The method 200 continues, in block 220, with the device generating a prompt to select one of the plurality of elements that satisfies one or more criteria regarding a topic of interest. In various implementations, the one or more criteria regarding the topic of interest includes a criterion that the selected one of the plurality of elements is text in a paragraph regarding the topic of interest. In various implementations, the one or more criteria regarding the topic of interest includes a criterion that the selected one of the plurality of elements is text in a paragraph regarding the topic of interest that includes text provided in the prompt.

The method 200 continues, in block 230, with the device submitting the prompt to a foundational model trained on a training dataset. In various implementations, the foundational model is a text-generating deep learning model. In various implementations, the foundational model is an image-generating deep learning model. In various implementations, the training dataset includes an internet dataset. In various implementations, the plurality of elements is a subset of the training dataset. For example, in various implementations, the training dataset include objectionable and unobjectionable content and the plurality of elements includes only unobjectionable content.

The method 200 continues, in block 240, with the device receiving, from the foundational model in response to the prompt, content including a selected one of the plurality of elements. In various implementations, the one or more criteria regarding the topic of interest includes a criterion that the selected one of the plurality of elements is an opening sentence in a paragraph regarding the topic of interest. In various implementations, the method 200 further includes generating an additional prompt to select one of the plurality of elements that satisfies a criterion that the selected one of the plurality of elements is a body sentence in a paragraph regarding the topic beginning with the opening sentence. The method 200 further includes submitting the additional prompt to the foundational model trained on the training dataset. The method 200 further includes receiving, from the foundational model in response to the additional prompt, additional content including an additional selected one of the plurality of elements. In various implementations, the content and the additional content (and, in various implementations, further additional content) is concatenated to generate a paragraph regarding the topic of interest.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:

receiving text indicating a topic of interest;

accessing a first dataset including a plurality of elements;

selecting a subset of the plurality of elements based on the text indicating the topic of interest;

submitting the text indicating the topic of interest and the subset of the plurality of elements to a text-generating deep learning model trained on a second dataset different than the first dataset; and receiving, from the text-generating deep learning model, text content concerning the topic of interest based on the text indicating the topic of interest and the subset of the plurality of elements.

2. The method of claim 1, wherein the plurality of elements includes a plurality of text elements.

3. The method of claim 2, wherein each of the plurality of elements includes a single letter or phoneme.

4. The method of claim 2, wherein each of the plurality of elements includes a single word.

5. The method of claim 2, wherein each of the plurality of elements includes a single sentence.

6. The method of claim 1, wherein the plurality of elements includes a plurality of image elements.

7. The method of claim 1, wherein the first dataset is a subset of the second dataset.

8. The method of claim 1, wherein the second dataset includes an internet dataset.

9. The method of claim 1, wherein selecting the subset of the plurality of elements based on the text indicating the topic of interest includes selecting an opening sentence of a paragraph regarding the topic of interest.

10. The method of claim 9, wherein submitting the text indicating the topic of interest and the subset of the plurality of elements includes requesting a body sentence of the paragraph regarding the topic of interest given the opening sentence.

11. The method of claim 9, wherein selecting the subset of the plurality of elements based on the text indicating the topic of interest includes submitting the text indicating the topic of interest to the text-generating deep learning model.

12. The method of claim 1, wherein the text further indicates one or more selection criteria and selecting the subset of the plurality of elements is further based on the selection criteria.

13. The method of claim 1, wherein the second dataset is larger than the first dataset.

14. A device comprising:

non-transitory memory; and one or more processors to:

receive text indicating a topic of interest;

access a first dataset including a plurality of elements;

selecting a subset of the plurality of elements based on the text indicating the topic of interest;

submit the text indicating the topic of interest and the subset of the plurality of elements to a text-generating deep learning model trained on a second dataset different than the first dataset; and receive, from the text-generating deep learning model, text content concerning the topic of interest based on the text indicating the topic of interest and the subset of the plurality of elements.

15. The device of claim 14, wherein the plurality of elements includes a plurality of text elements.

16. The device of claim 14, wherein the first dataset is a subset of the second dataset.

17. The device of claim 14, wherein the second dataset includes an internet dataset.

18. The device of claim 14, wherein the one or more processors are to select the subset of the plurality of elements based on the text indicating the topic of interest by selecting an opening sentence of a paragraph regarding the topic of interest.

19. The device of claim 18, wherein the one or more processors are to submit the text indicating the topic of interest and the subset of the plurality of elements by requesting a body sentence of the paragraph regarding the topic of interest given the opening sentence.

20. A non-transitory memory storing one or more programs, which, when executed by one or more processors of a device, cause the device to:

receive text indicating a topic of interest;

access a first dataset including a plurality of elements;

selecting a subset of the plurality of elements based on the text indicating the topic of interest;

submit the text indicating the topic of interest and the subset of the plurality of elements to a text-generating deep learning model trained on a second dataset different than the first dataset; and receive, from the text-generating deep learning model, text content concerning the topic of interest based on the text indicating the topic of interest and the subset of the plurality of elements.

* * * * *